United States Patent
Pollock et al.

[11] 3,815,314
[45] June 11, 1974

[54] PACKAGING METHOD

[75] Inventors: William J. Pollock, Glenview; Peter Tagalakis, Chicago, both of Ill.

[73] Assignee: Phoenix Closures, Inc., Chicago, Ill.

[22] Filed: Sept. 11, 1972

[21] Appl. No.: 287,825

[52] U.S. Cl............................. 53/15, 53/37, 53/39
[51] Int. Cl............................................ B65b 7/28
[58] Field of Search............... 53/15, 37, 39, 41, 42, 53/27; 215/40, 43; 156/69, 262, 272

[56] References Cited
UNITED STATES PATENTS

| 2,387,439 | 10/1945 | Grabus et al. | 53/15 |
| 2,937,481 | 5/1960 | Palmer | 53/39 |
| 3,460,310 | 8/1969 | Adcock et al. | 53/39 |

Primary Examiner—Robert L. Spruill
Attorney, Agent, or Firm—Diller, Brown, Ramik & Wight

[57] ABSTRACT

This disclosure relates to a novel packaging method which includes the steps of packaging a product into a container having a mouth defined by a lip, inserting a metallic-nonmetallic-metallic laminated liner upon the container lip in sandwiched relationship between the container lip and an end panel of an associated closure, and inducing heat in the metallic laminate sufficient to fuse one of the metallic laminates to the closure end panel and the other of the metallic laminates to the container lip. Preferably the bond strength between the other of the metallic laminates and the container lip is great enough to resist delamination upon the removal of the closure to thus provide an inner seal. Additionally, the bond strength between the one metallic laminate and the end panel is sufficiently strong to retain the non-metallic laminate with the closure upon the removal thereof whereby the nonmetallic laminate can be used for resealing purposes after the closure has been once removed from the container.

11 Claims, 6 Drawing Figures

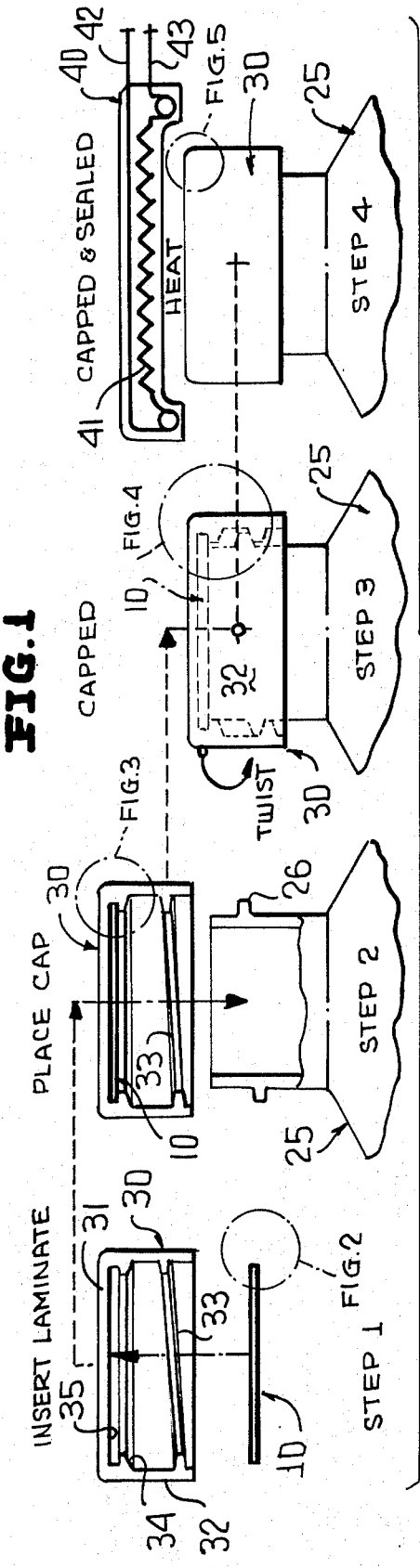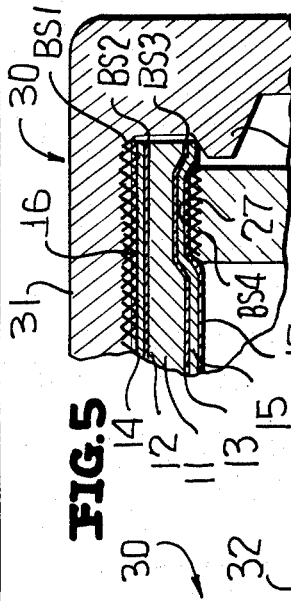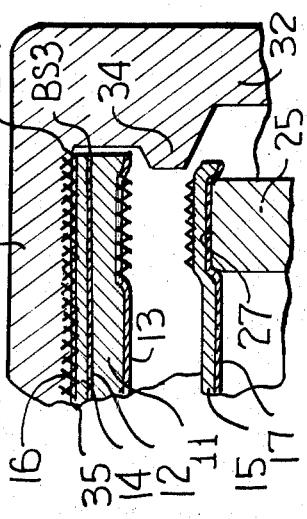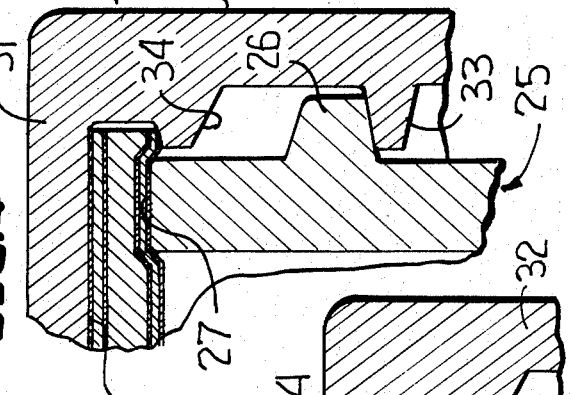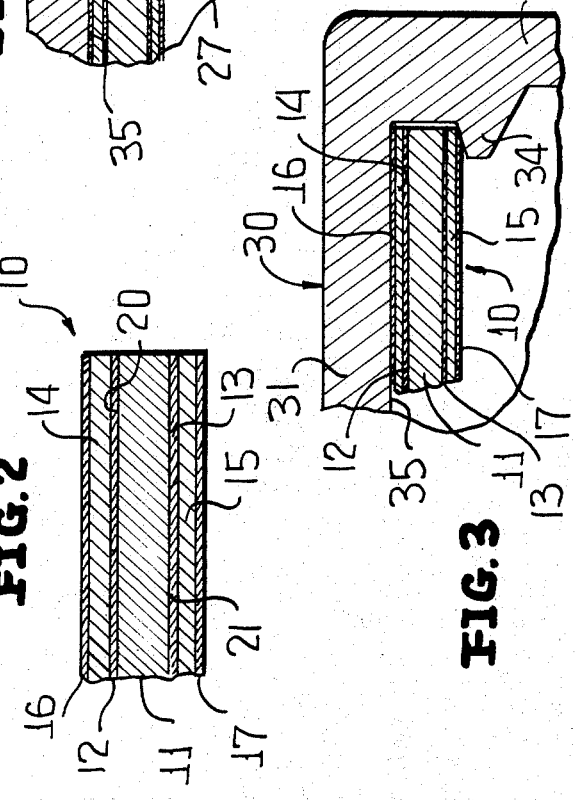

PACKAGING METHOD

An object of this invention is to provide a novel method of packaging a product in a container having a mouth defined by a lip which includes constructing a metallic-nonmetallic-metallic laminated liner and inserting the same in sandwiched relationship between the container lip and an end panel of an associated closure, and inducing heat in the metallic laminate sufficient to fuse one of the metallic laminates to the closure end panel and the other of the metallic laminates to the container lip.

In keeping with a more specific aspect of the novel invention, a further object includes the steps heretofore described wherein the one metallic laminate is fused to the closure end panel with a first bond strength greater than a second bond strength between the one metallic laminate and the nonmetallic laminate and a third bond strength between the other metallic laminate and the nonmetallic laminate, and the other metallic laminate is fused to the container lip with a fourth bond strength greater than the first through the third bond strengths, thus providing differential delamination of the liner upon removal of the closure from the associated container.

In keeping with a further object of this invention the third bond strength is weaker than the first, second and fourth bond strengths whereby upon the removal of the closure the liner will delaminate between the other metallic laminate and the nonmetallic laminate.

Still another object of this invention is to provide a novel packaging method wherein the first and second bond strengths are greater than the third bond strength whereby upon the removal of the closure the one metallic laminate and the nonmetallic laminate will remain adhered to the closure end panel.

In keeping with another aspect of this invention, a prepackaging method is provided which includes the steps of providing a closure having an end panel and a peripheral skirt, providing a liner as at least a metalic-nonmetallic-laminate, assembling the liner within the closure within the metallic laminate proximate the closure end panel, and inducing heat in the metallic laminate sufficient to fuse the same to the end panel whereby during subsequent handling, storage, shipment, etc. the components will not accidentally and/or inadvertently disunite.

Still another object of this invention is to provide a novel prepackaging method wherein the united closure and liner are shipped to a packager with the latter providing a container having a mouth defined by a lip, packaging a product in the container, and assembling the closure upon the container with the nonmetallic laminate upon the container lip.

Still another object of this invention is to provide a novel prepackaging method of the type immediately aforesaid wherein the liner is mechanically retained within the closure prior to the heat inducing step, said retaining step being performed by either adhesive bonding the metallic laminate to the closure end panel and/or by mechanically interlocking the periphery of the liner within the closure.

Still another object of this invention is to provide a novel prepackaging method which includes the steps of providing a closure having an end panel and a peripheral skirt, providing a liner as at least a metallic-nonmetallic-metallic laminate, assembling the liner within the closure with one of the metallic laminates proximate the closure end panel, inducing heat in the one metallic laminate sufficient to fuse the one metallic laminate to the end panel whereby during subsequent handling, storage, shipment, etc. the components will not accidentally disunite, thereafter shipping the united closure and liner to a packager, providing a container having a mouth defined by a lip, packaging a product in the container, assembling the closure upon the container with the other metallic laminate proximate the container lip, and thereafter inducing heat at least in the other metallic laminate sufficient to fuse the same to the container lip.

A further object of this invention is to provide a novel method including the steps immediately heretofore set forth and further including the step of mechanically retaining the liner in the closure prior to the heat inducing step, the retaining step being performed by adhesive bonding the one metallic laminate to the closure end panel and/or mechanically interlocking the periphery of the liner within the closure.

A final object of this invention is to provide a novel liner for a closure comprised as a disc-like laminated body including a nonmetallic ply, and adhesive on opposite faces of the nonmetallic ply, and a metallic ply bonded by the adhesive to each of the opposite faces, and the bond strength of the adhesive between one of the metallic plies and the nonmetallic ply being greater than the bond strength of the adhesive between the other of the metalic plies and the nonmetallic ply whereby upon being adhered to a container by heat induced in the liner and the subsequent removal therefrom the liner will delaminate between the nonmetallic and said other metallic plies.

With the above and other objects in view that will hereinafter appear, the nature of the invention will be more clearly understood by reference to the following detailed description, the appended claimed subject matter, and the several views illustrated in the accompanying drawing.

IN THE DRAWING:

FIG. 1 is an exploded fragmentary view partially in side elevation and partially in cross section, and illustrates the steps of one packaging method of this invention including those of inserting a laminated liner into a closure, assembling the closure with a packaged container, assembling the closure and packaged container, and thereafter including heating the liner to adhere the same to a lip of the container and an end panel of the closure.

FIG. 2 is a highly enlarged fragmentary sectional view of the encircled portion appropriately identified in FIG. 1, and illustrates the laminated construction of the liner.

FIG. 3 is an enlarged fragmentary sectional view of the corresponding encircled portion of FIG. 1 and illustrates the manner in which the liner of FIG. 2 is mechanically retained within the closure adjacent an end panel thereof.

FIG. 4 is a fragmentary enlarged sectional view of the associated encircled portion of FIG. 1, and illustrates the manner in which a peripheral or circumferential portion of the liner is compressed upon the assembly of the closure upon the container.

FIG. 5 is an enlarged fragmentary sectional view corresponding to the encircled portion of FIG. 1, and illustrates the manner in which the liner is fused to the closure end panel and the container lip by virtue of the heat induced therein.

FIG. 6 is a fragmentary sectional view similar to FIG. 5, but illustrates the manner in which one of the metallic plies or laminates remains adhered to the container lip upon the removal of the closure therefrom due to differential bond strengths between various plies of the laminate, the closure and the container lip.

Before describing the novel methods of this invention, reference is first made to FIG. 2 of the drawing which illustrates a liner formed as a laminated body 10 of a generally circular configuration. The liner or body 10 includes a plurality of laminates or plies 11 through 17, although variations may be made therein, as will be described further herein.

A centermost of the laminates or plies 11 is constructed of nonmetallic material, preferably pulpboard or similar paper stock material, and is generally the thickest of the plurality of laminates. The laminate 11 is formed from generally resilient, compressible material which functions to assure intimate contact between an associated closure end panel and container lip, as will be described more fully hereinafter, incident to a heat sealing operation. The resilient nature of the laminate 11 is also of particular importance for resealing purposes, again as will be described hereinafter.

The adhesive 12, 13 is applied in a conventional manner to respective opposite faces or surfaces 20, 21 of the nonmetallic laminate 11. The purpose of the adhesives 12, 13 is to adhere to the nonmetallic laminate 11 the respective laminates 14, 15.

The laminates 14, 15 are constructed from metallic foil material as, for example, aluminum foil or any other material which can be heated by induction when positioned in an appropriate electric field. The foil must not only be capable of being heated by induced energy, but the foil 15 must be impermeable inasmuch as it functions as a seal, as will be noted fully hereinafter.

Depending upon the particular materials involved the liner 10 may or may not require the coatings or laminates 16, 17 which are conventional copolymer resins, polyethylene, copolymer polyethylene, elvax, ionomer resin, wax-resin hot melts or other types of resins or adhesives which are activated by heat, the function being that of bonding the metallic laminates 14, 15 to a closure end panel and a container lip, respectively. In addition the copolymer laminate 16 may be spot-coated with an adhesive to temporarily retain the liner within an associated closure or the laminate 16 may be omitted and the adhesive applied directly to the metallic laminate 14 for the same purpose. In lieu of the mechanical connection achieved by the adhesive or in order to augment the same the closure may be provided with a circumferential bead about the periphery of its peripheral skirt to additionally assure that the liner cannot be accidentally and/or inadvertently dislodge therefrom, again as will be described immediately hereinafter.

Reference is now made to FIG. 4 of the drawing which illustrates a conventional container preferably constructed from polymeric and/or copolymeric material, although glass and metal may be employed, the container body being generally designated by the reference numeral 25 and being constructed to include an external thread or a plurality of lugs 26 and an uppermost terminal sealing lip 27. The container 25 may be constructed from polyethylene as might be a closure 30 having an end panel 31 and a peripheral skirt 32 whose thread 33 or lugs cooperate with the thread 26 or lugs to maintain these components in conventional assembled relationship. A radially inwardly directed circumferential bead 34 functions to retain the liner 10 within the closure 30 immediately adjacent an inner face 35 of the end panel 31.

Reference is now made to FIG. 1 of the drawing which from left to right illustrates four steps identified as STEP 1 through STEP 4.

Considering STEP 1 of the method illustrated in FIG. 1, the liner 10 is first assembled into the closure 30 with the copolymer resin coating 16 immediately adjacent and against the surface 35 of the end panel 31, as is best shown in FIG. 3. Depending upon the materials involved the copolymer resin coating 16 may be eliminated or, if found necessary or desirable, a spot-coating of an adhesive atop the laminate 16 may be employed to temporarily retain the liner 10 within the closure 30 prior to the heat sealing operation. In conjunction with or in lieu of the adhesive the closure may be provided with the retaining bead 34, in the manner heretofore described. The assembled closure and container are best shown in FIG. 3 whereafter this assembly is united in STEP 2 of FIG. 1 in a conventional manner by conventional capping machinery to thread or otherwise secure the closure upon the container. Reference is made to FIG. 4 whereat the closure 30 is shown fully seated upon the container 25 with the capping force being sufficient to compress the nonmetallic laminate 11 in the area of the container lip 27. The nonmetallic laminate 11 may be constructed from pulpboard, cork, plastics such as polystyrene and polyethylene foam, rubber, etc.

In STEP 4 there is illustrated a high frequency heater 40 having suitable induction coils 41 coupled by leads 42, 43 to a source of electrical energy (not shown). Upon being subjected to the electrical field generated by the high frequency induction heater 40 the foils 14, 15 are heated to an appropriate temperature depending, of course, upon the characteristics of the material thereof, those of the resin coatings 16, 17, and the materials of the closure 30 and container 25. As the temperature of the metallic laminates 14, 15 is increased the copolymer resin coatings 16, 17 become heated sufficiently to bond the liner to the surface 35 of the end panel 31 of the closure 30 and to the container lip 27 of the container 25, respectively. The bonds thus created are best illustrated in FIG. 5. In this same figure are indicated bonding layers between the various plies having varied bond strengths, the same being indicated by the reference characters BS (bond strength) 1, BS (bond strength) 2, BS (bond strength) 3, and BS (bond strength) 4. Considering the latter first, the bond strength BS4 between the metalic laminate 15 and the container lip 27 is such as to assure that the laminate 15 will remain adhered to the container lip 27 when the closure 30 is removed, as is best illustrated in FIG. 6. Moreover, the bond strength BS3 of the adhesive 13 is less than that of the bond strength BS4 whereby upon the removal of the closure 30, as again shown in FIG. 6, delamination will occur between the metallic laminate 15 and the nonmetallid (pulpboard) laminate 11. Due to this relative bond strength differential (between bond strengths BS3 and BS4) the metallic laminate 15 remains adhered to the container lip 27 and serves as an inner seal upon the removal of the closure 30 whereas the laminate 11 will function as a reclosure seal after the laminate 15 has been removed and the closure reclosed upon the container. However, in order to assure that the laminates 11, 14 remain adhered to the closure 30 upon the removal thereof the respective bond strengths BS2 and BS1 are greater than the bond strength BS3 but less than the bond strength BS4. Thus upon the removal shown in FIG. 6 the laminate 14 remains adhered to the inner face 35 of the closure 30 and also adhered thereto through the adhesive 12 is the nonmetallic laminate 11. In this manner the laminates 11, 14 cannot be lost or dislodged upon the removal of the closure 30 after the heat sealing operation and reclosures can be performed in a repetitive manner with a seal being achieved between the container lip 27 and the laminate 11, upon, of course, the removal and discarding of the inner seal 15.

In keeping with another aspect of this invention, the liner 10 may be constructed to include only the laminates 11, 12, 14 and 16 with the laminates 13, 15 and 17 being omitted. By practicing the method heretofore described relative to FIG. 1 the induced heating of STEP 4 results in the fusion of the copolymer resin laminate 16 to the end panel 31 of the closure 30, but due to the absence of the laminates 13, 15 and 17 the nonmetallic laminate 11 is merely compressed at the container lip 27 but does not adhere thereto. Liners of this type are used wherein it is unnecessary for the contents to be sealed in a hermetic fashion, as is accomplished by the impermeable foil laminate 15 in conjunction with the method of FIG. 1.

In keeping with yet another aspect of this invention, the liner 10 may be constructed to include only the laminates 11, 12, 14, 16 and either of the laminates 13 or 17, but not the metallic laminate 15. In this case, assuming that the laminates 15, 17 have been omitted, the laminate 13 may be, for example, vinyl, saran, Mylar, etc. adhere to the pulp laminate 11. However, by practicing the method heretofore described relative to FIG. 1 the induced heating of STEP 4 results in the fusion of the laminate 16 to the end panel 31, but due to the absence of the laminate 15 the nonmetallic laminate 13 will not adhere to the container lip 27.

In further keeping with this invention the liner 10 may be constructed to include all laminates illustrated in FIGS. 5 and 6 except the laminate 17. Here again the laminate 15 is constructed of lead, tin, aluminum foil, or similar metallic material and though the same heats up when subjected to the induction field (STEP 4) the laminate 15 will not adhere to the container lip 27 since it is uncoated or devoid of the adhesive coating 17.

In further accordance with this invention the method of FIG. 1 can be augmented by the inclusion of another induction heating step after the liner and closure have been assembled, but prior to the shipping thereof to the packager and the eventual capping of the container. For example, after the liner has been inserted into the closure in keeping with STEP 1 and assembled as shown in FIG. 3, the closure and liner in the absence of the container and its product may be subjected to an induction heating operation resulting in the bonding of the foil laminate 14 to the inner surface 35 of the end panel 31 of the closure 30. In this manner when a plurality of the closures 30 are shipped from the manufacturer to the packager there is far less likelihood that the liners 10 will become accidentally and/or inadvertently disunited from the closure 30.

In addition to the foregoing descriptions of the primary embodiment of this invention and the modifications thereof, it is also intended in keeping with this invention to construct the closure or cap 30 from metallic rather than nonmetallic material. Obviously a metallic cap will be heated in the induction field of STEP 4 and such heat will be transferred by conduction to a liner, be it metallic or nonmetallic, and to adhering type coating thereon as, for example, the coating 17 upon the laminate 15 to achieve the seal at the container lip 27 or similarly achieving a bonding between the laminate 16 and the internal surface 35 of the metallic cap 30.

While preferred forms and arrangements of parts have been shown in illustrating the invention, it is to be clearly understood that various changes in details and arrangement of parts may be made without departing from the spirit and scope of this disclosure.

We claim:

1. A packaging method comprising the steps of packaging a product in a container having a mouth defined by a lip, inserting a metallic-nonmetallic-metallic laminated liner upon the container lip in sandwiched relationship between the container lip and an end panel of an associated closure, and inducing heat in the metallic laminates sufficient to fuse one of the metallic laminates to the closure end panel and the other of the metallic laminates to the container lip.

2. The packaging method as defined in claim 1 including the step of constructing the metallic-nonmetallic-metallic laminated liner such that the bond strength between said other metallic laminate and said container lip is greater than the bond strength between said other metallic laminate and said nonmetallic laminate whereby upon the attempted removal of said liner and other metallic laminate will remain adhered to said container lip.

3. The packaging method as defined in claim 1 including the step of constructing the metallic-nonmetallic-metallic laminate liner such that the bond strength between said one metallic laminate and said closure end panel is greater than the bond strength between said other metallic laminate and said nonmetallic laminate whereby upon the attempted removal of said liner said one metallic laminate will remain adhered to said closure end panel.

4. The packaging method as defined in claim 1 wherein the one metallic laminate is fused to the closure end panel with a first bond strength greater than a second bond strength between said one metallic laminate and said nonmetallic laminate and a third bond strength between said other metallic laminate, and said other metallic laminate is fused to the container lip with a fourth bond strength greater than said first through third bond strengths.

5. The packaging method as defined in claim 4 wherein said third bond strength is weaker than said first, second and fourth bond strengths whereby upon the removal of said closure said liner will delaminate between the other metallic laminate and the nonmetallic laminate.

6. The packaging method as defined in claim 5 wherein the first and second bond strengths are greater than the third bond strength whereby upon the removal of said closure said one metallic laminate and said nonmetallic laminate will remain adhered to said closure.

7. A packaging method comprising the steps of providing a closure having an end panel and a peripheral skirt, providing a liner as at least a metallic-nonmetallic laminate, assembling the liner within the closure with the metallic laminate proximate the closure end panel, inducing heat in the metallic laminate sufficient to fuse the same to the end panel whereby during subsequent handling, storage, shipment, etc. the components will not accidentally disunite, shipping the united closure and liner to a packager, providing a container having a mouth defined by a lip, packaging a product in the container, and assembling the closure upon the container with the nonmetallic laminate upon the container lip.

8. A packaging method comprising the steps of providing a closure having an end panel and a peripheral skirt, providing a liner as at least a metallic-nonmetallic-metallic laminate, assembling the liner within the closure with one of the metallic laminates proximate the closure end panel, inducing heat in the one metallic laminate sufficient to fuse the one metallic laminate to the end panel whereby during subsequent handling, storage, shipment, etc. the components will not accidentally disunite, shipping the united closure and liner to a packager, providing a container having a mouth defined by a lip, packaging a product in the container, assembling the closure upon the container with the other metallic laminate proximate the container lip, and inducing heat at least in the other metallic laminate sufficient to fuse the same to the container lip.

9. The method as defined in claim 8 including the step of mechanically retaining the liner in the closure prior to the heat inducing step.

10. The method as defined in claim 8 including the step of mechanically retaining the liner in the closure prior to the heat inducing step, said retaining step being performed by adhesive bonding the one metallic laminate to the closure end panel prior to the first heat inducing step.

11. The method as defined in claim 8 including the step of mechanically retaining the liner in the closure prior to the heat inducing step, said retaining step being performed by mechanically interlocking the periphery of the liner within the closure prior to the first heat inducing step.

* * * * *